US006778083B2

(12) United States Patent
Auerbach et al.

(10) Patent No.: US 6,778,083 B2
(45) **Date of Patent: *Aug. 17, 2004**

(54) ELECTRONIC LOCKING SEAL

(75) Inventors: Micha Auerbach, Maccabim (IL); Rony Cohen, Zoran (IL); Arcadi Genin, Bat Yam (IL); Ran Sender, Tel Aviv (IL)

(73) Assignee: HI-G-TEK Ltd., Or-Yehuda (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/228,841

(22) Filed: Aug. 27, 2002

(65) Prior Publication Data

US 2004/0041704 A1 Mar. 4, 2004

(51) Int. Cl.[7] .................................................. H04Q 7/00

(52) U.S. Cl. .............................. 340/539.1; 340/539.31; 340/545.6; 340/568.1; 340/687

(58) Field of Search .............................. 340/539.1, 432, 340/539.31, 540, 542, 546, 548, 545.6, 568.1, 568.2, 568.3, 571, 686.1, 687

(56) References Cited

U.S. PATENT DOCUMENTS

| | | | | | |
|---|---|---|---|---|---|
| 4,750,197 | A | | 6/1988 | Denekamp et al. | 379/58 |
| 5,056,837 | A | | 10/1991 | Fuehrer | 292/307 R |
| 5,097,253 | A | | 3/1992 | Eschbach et al. | 340/545 |
| 5,127,687 | A | | 7/1992 | Guiler | 292/327 |
| 5,166,929 | A | * | 11/1992 | Lo | 370/448 |
| 5,169,188 | A | | 12/1992 | Kupperman et al. | 292/307 R |
| 5,189,396 | A | | 2/1993 | Stobbe | 340/541 |
| 5,396,227 | A | * | 3/1995 | Carroll et al. | 340/825.36 |
| 5,406,263 | A | | 4/1995 | Tuttle | 340/572 |
| 5,421,177 | A | | 6/1995 | Sieber et al. | 70/57.1 |
| 5,471,212 | A | * | 11/1995 | Sharpe et al. | 342/51 |
| 5,525,992 | A | * | 6/1996 | Froschermeier | 340/10.2 |
| 5,534,847 | A | * | 7/1996 | McGregor | 340/432 |
| 5,565,858 | A | | 10/1996 | Guthrie | |
| 5,574,977 | A | * | 11/1996 | Joseph et al. | 455/450 |
| 5,587,702 | A | | 12/1996 | Chadfield | 340/542 |
| 5,594,738 | A | * | 1/1997 | Crisler et al. | 370/347 |
| 5,615,249 | A | * | 3/1997 | Solondz | 455/450 |
| 5,630,209 | A | * | 5/1997 | Wizgall et al. | 455/521 |
| 5,642,355 | A | * | 6/1997 | Smith | 370/337 |
| 5,656,996 | A | | 8/1997 | Houser | 340/541 |
| 5,691,980 | A | | 11/1997 | Welles, II et al. | |
| 5,836,002 | A | * | 11/1998 | Morstein et al. | 340/568.1 |
| 5,910,944 | A | * | 6/1999 | Callicotte et al. | 370/311 |
| 5,912,623 | A | * | 6/1999 | Pierson | 340/573.4 |
| 5,940,006 | A | * | 8/1999 | MacLellan et al. | 340/10.1 |
| 6,055,426 | A | | 4/2000 | Beasley | |
| 6,069,563 | A | | 5/2000 | Kadner et al. | 340/571 |
| 6,154,139 | A | * | 11/2000 | Heller | 340/573.4 |
| 6,166,627 | A | | 12/2000 | Reeley | |
| 6,216,003 | B1 | * | 4/2001 | Hamajima et al. | 455/437 |
| 6,243,005 | B1 | * | 6/2001 | Haimovich et al. | 340/427 |
| 6,256,493 | B1 | * | 7/2001 | Dorenbosch et al. | 455/419 |
| 6,288,629 | B1 | * | 9/2001 | Cofino et al. | 340/10.1 |
| 6,300,903 | B1 | * | 10/2001 | Richards et al. | 342/450 |
| 6,366,779 | B1 | * | 4/2002 | Bender et al. | 455/450 |
| 6,369,710 | B1 | * | 4/2002 | Poticny et al. | 340/572.1 |
| 6,421,540 | B1 | * | 7/2002 | Gilhousen et al. | 455/458 |
| 6,466,558 | B1 | * | 10/2002 | Ling | 370/334 |
| 6,507,567 | B1 | * | 1/2003 | Willars | 370/321 |
| 6,590,886 | B1 | * | 7/2003 | Easton et al. | 370/342 |
| 6,593,845 | B1 | * | 7/2003 | Friedman et al. | 340/10.33 |

* cited by examiner

*Primary Examiner*—Nina Tong
(74) *Attorney, Agent, or Firm*—Ladas & Parry

(57) ABSTRACT

A tamper-resistant remotely monitorable electronic seal including a shaft portion, a socket arranged to engage the shaft portion in a monitorable manner, whereby disengagement of the socket and the shaft portion results in a monitorable event, and a wireless communicator associated with at least one of the shaft portion and the socket and being operative to provide a remotely monitorable indication of the monitorable event.

14 Claims, 8 Drawing Sheets

ELECTRONIC LOCKING SEAL

FIELD OF THE INVENTION

The present invention relates to electronic seals generally and more particularly to tamper-resistant electronic seals.

BACKGROUND OF THE INVENTION

The following U.S. Patents are believed to be representative of the prior art:

U.S. Pat. Nos. 4,750,197, 5,056,837; 5,097,253, 5,127,687; 5,169,188; 5,189,396; 5,406,263, 5,421,177, 5,587,702; 5,656,996 and 6,069,563.

SUMMARY OF THE INVENTION

The present invention seeks to provide an improved electronic seal

There is thus provided in accordance with a preferred embodiment of the present invention a tamper-resistant remotely monitorable electronic seal including a shaft portion, a socket arranged to engage the shaft portion in a monitorable manner, whereby disengagement of the socket and the shaft portion results in a monitorable event, and a wireless communicator associated with at least one of the shaft portion and the socket and being operative to provide a remotely monitorable indication of the monitorable event. Preferably, the wireless communicator is a transceiver. Additionally, the shaft portion includes at least one conductive path which is interrupted in response to disengagement of the socket and the shaft portion and wherein the wireless communicator is operative to provide a remotely monitorable indication of the monitorable event.

In accordance with another preferred embodiment of the present invention, the shaft portion includes a frangible shaft portion having a press-fit tip, the socket includes a press-fit socket arranged to engage the press-fit tip in a destructably removable manner, whereby disengagement of the socket and the shaft portion results in breakage of the shaft portion, the at least one conductive path extends at least through the shaft portion and is breakable in response to breakage of the shaft portion, and the wireless communicator is associated with at least one of the shaft portion and the press-fit socket and is operative to provide a remotely monitorable indication of the integrity or lack of integrity of the at least one conductive path. Preferably, the at least one conductive path is defined by conductors extending through the shaft portion which are in electrical contact with a conductor formed in the press-fit socket when the shaft portion and the socket are in press-fit engagement. Additionally, the press-fit tip includes a toothed tip. Alternatively, the at least one conductive path includes at least one reed switch which is operated by a magnet associated with the socket whereby when the shaft portion is separated from the socket for any reason, the at least one conductive path is broken.

In accordance with yet another preferred embodiment of the present invention, the shaft portion includes a frangible shaft portion having a lockable portion, the socket includes a locking element arranged to engage the lockable portion in a destructably removable manner, whereby disengagement of the locking element and the shaft portion results in breakage of the shaft portion, the at least one conductive path extends at least through the shaft portion and is breakable in response to breakage of the shaft portion, and the wireless communicator is associated with at least one of the shaft portion and the socket and is operative to provide a remotely monitorable indication of the integrity or lack of integrity of the at least one conductive path. Preferably, the shaft portion includes a groove adaptable for lockable engagement with the locking element. Additionally, the at least one conductive path includes at least one reed switch which is operated by a magnet associated with the socket whereby when the shaft portion is separated from the socket for any reason, the at least one conductive path is broken.

In accordance with a further preferred embodiment of the present invention, the communicator is located in a sensing circuitry and communicator housing integrally formed with the shaft portion. Preferably, the frangible shaft portion includes at least one frangible location having relatively weak mechanical strength as compared with other portions of the shaft portion.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
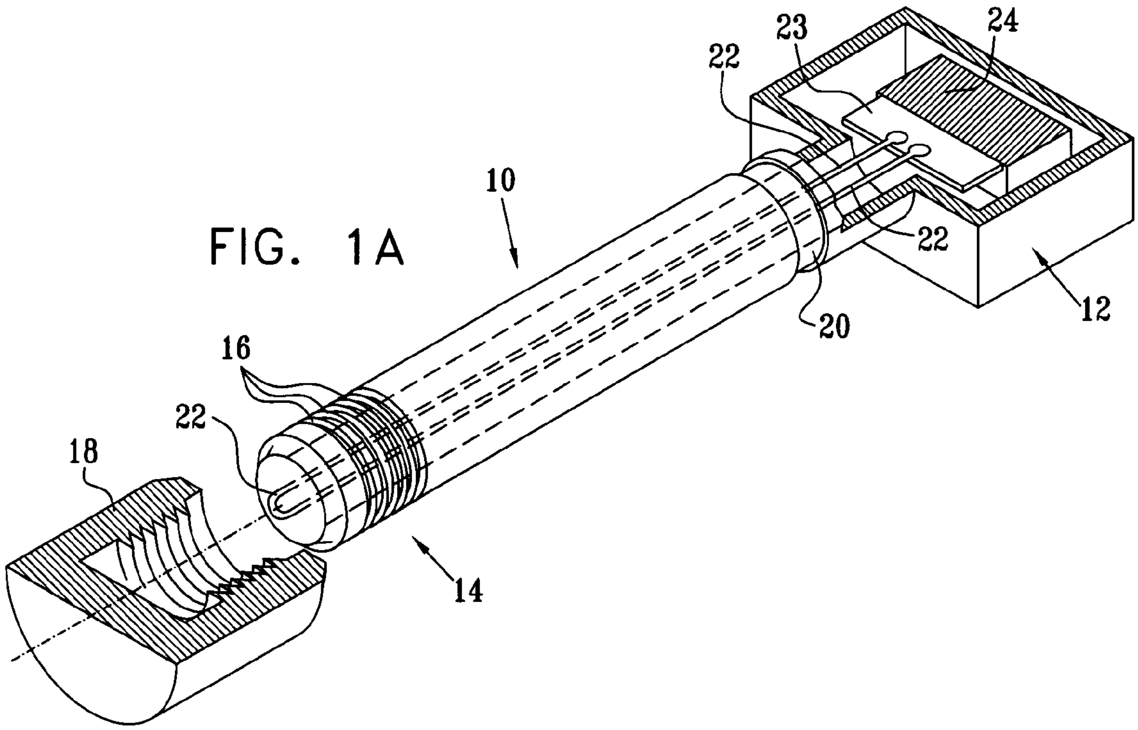
FIGS. 1A and 1B are simplified pictorial illustrations of two stages in the assembly of a press-fit electronic seal constructed and operative in accordance with a preferred embodiment of the present invention.
Figure 1B:
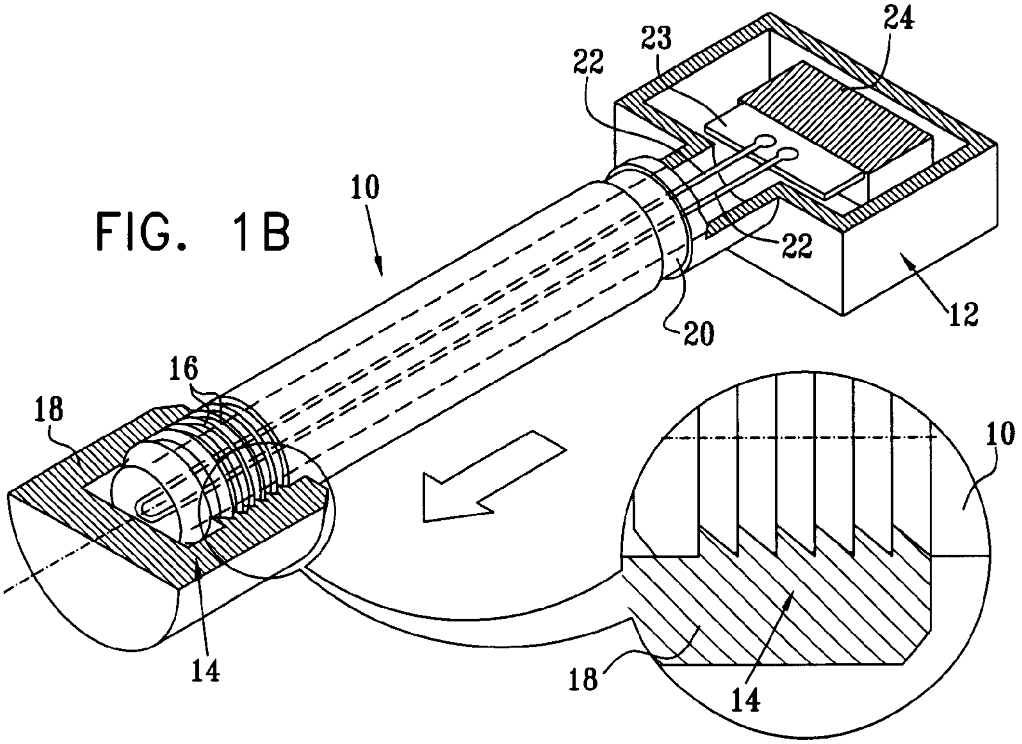

Reference is now made to FIGS. 1A and 1B, which are simplified pictorial illustrations of two stages in the assembly of a press-fit electronic seal constructed and operative in accordance with a preferred embodiment of the present invention.

As seen in FIGS. 1A and 1B, there is provided a tamper-resistant electronic seal which preferably comprises a shaft portion 10, which is integrally formed with or fixed to a sensing circuitry and transceiver portion 12 Shaft portion 10 preferably has a generally cylindrical configuration and terminates in a press-fit tip 14, preferably formed with a series of circumferential teeth 16 which are adapted for press-fit engagement with corresponding tooth-like recesses formed in a socket 18. The press-fit engagement between tip 14 of shaft portion 10 and socket 18 is preferably such that it is impossible to remove the tip 14 from the socket 18 without breaking the shaft portion 10.

Shaft portion 10 preferably includes a weakened frangible portion 20, located intermediate the sensing circuitry and transceiver portion 12 and the tip 14. Frangible portion 20 is preferably located closer to sensing circuitry and transceiver portion 12 than to tip 14 and typically has a lesser thickness than the remainder of the shaft portion 10.

A conductive loop 22 preferably extends through shaft portion 10 through to the tip 14 thereof and is configured and mounted in shaft portion 10, such that breakage of the shaft portion 10 produces a disconnection or significant change in the electrical properties of the conductive loop 22.

In accordance with a preferred embodiment of the present invention, sensing circuitry 23 and an RF transceiver 24 are housed within sensing circuitry and transceiver portion 12 Sensing circuitry 23 is electrically coupled to conductive loop 22 and senses the integrity thereof Receiving an output from sensing circuitry 23 is transceiver 24, which is operative to provide transmitted information indicating whether the conductive loop 22 is intact. Conventional wireless monitoring circuitry (not shown) may be employed to receive information which is transmitted by RF transceiver 24 and indicates tampering with the seal which results in breakage of the shaft portion 10.

Figure 2A:
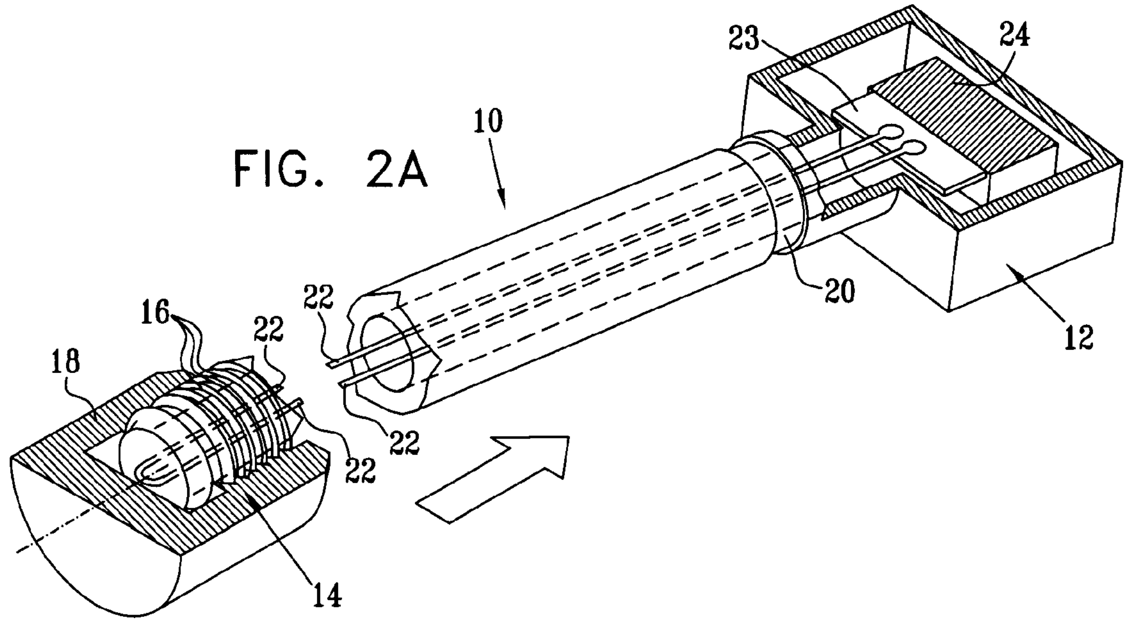
FIGS. 2A and 2B are simplified pictorial illustrations of two different types of breaks produced in the press-fit electronic seal of FIGS. 1A and 1B.
Figure 2B:
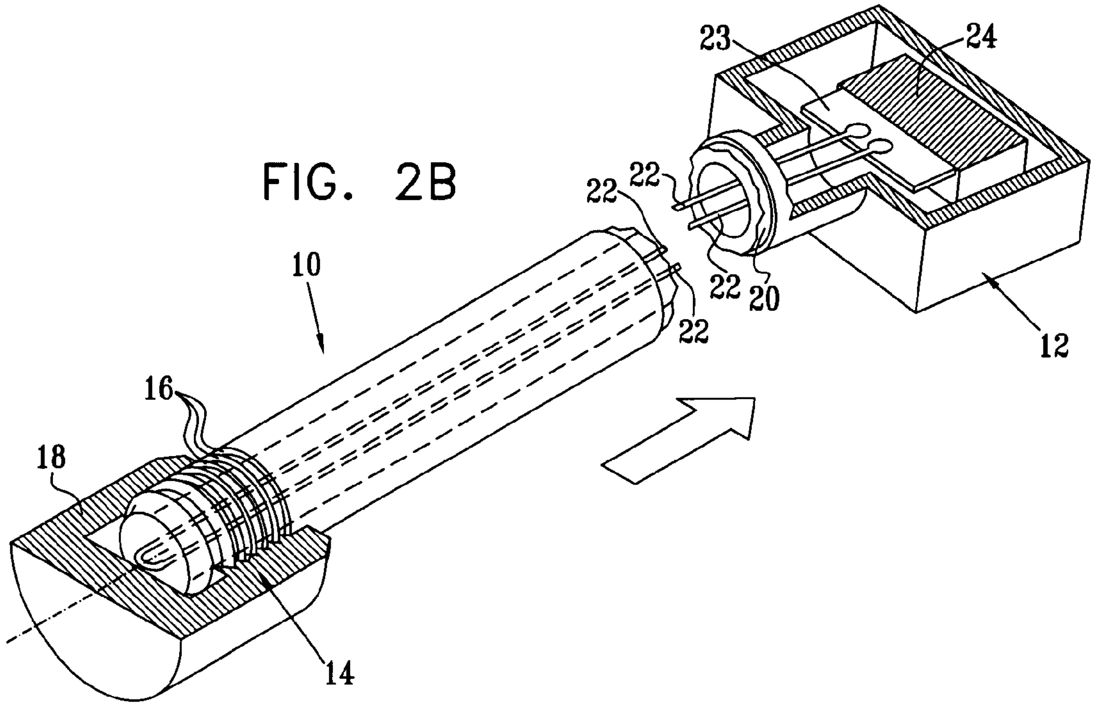

Reference is now made to FIGS. 2A and 2B, which are simplified pictorial illustrations of two different types of breaks produced in the press-fit electronic seal of FIGS. 1A and 1B. As noted above, application of force to the seal of FIGS. 2A and 2B in an attempt to separate shaft portion 10 from socket 18 will not cause tip 14 to be disengaged from socket 18, without first breaking the shaft portion 10. FIG. 2A shows such a break at a location along the shaft portion 10 which lies just above the tip 14. It is seen that this break produces a disconnection or significant change in the electrical properties of the conductive loop 22.

FIG. 2B shows such a break at the frangible portion 20 along the shaft portion 10 It is seen that this break also produces a disconnection or significant change in the electrical properties of the conductive loop 22.

Figure 3A:
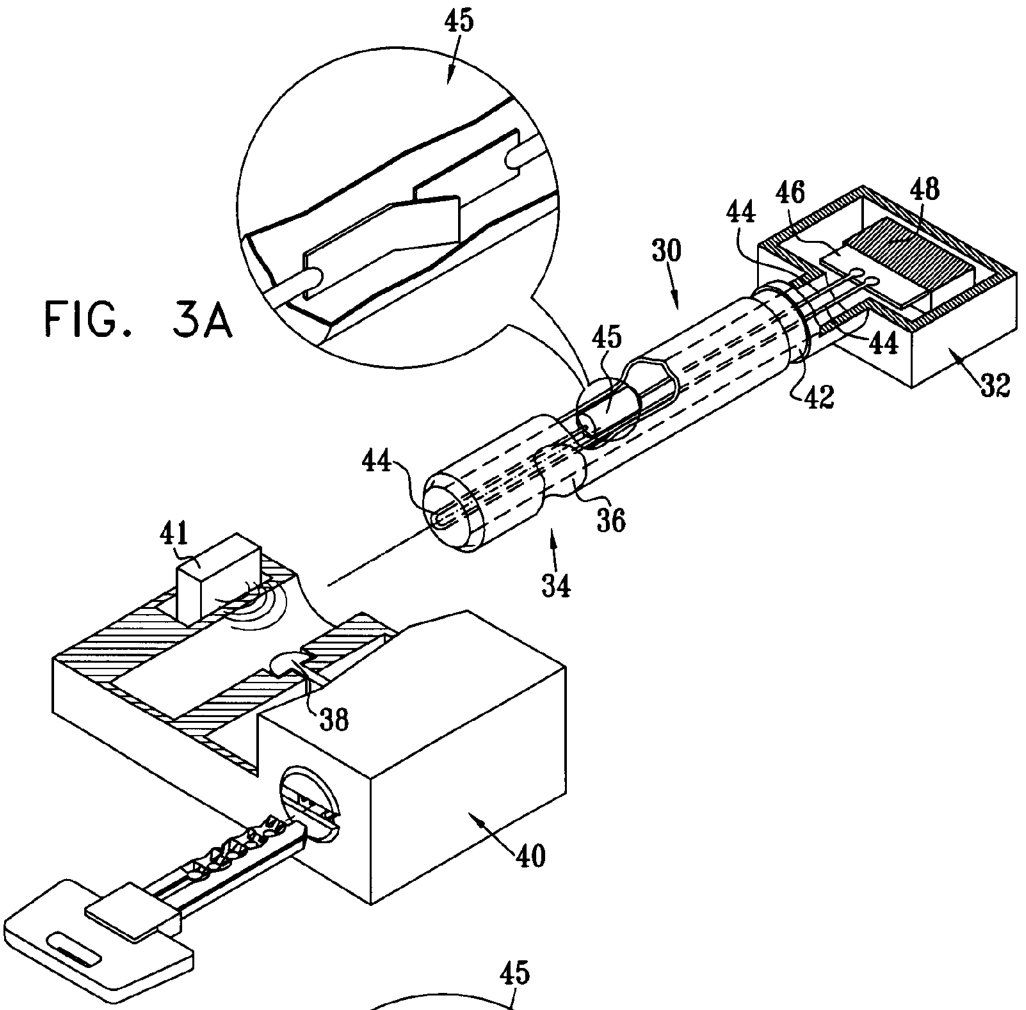
FIGS. 3A and 3B are simplified pictorial illustrations of two stages in the assembly of a lockable electronic seal constructed and operative in accordance with a preferred embodiment of the present invention.
Figure 3B:
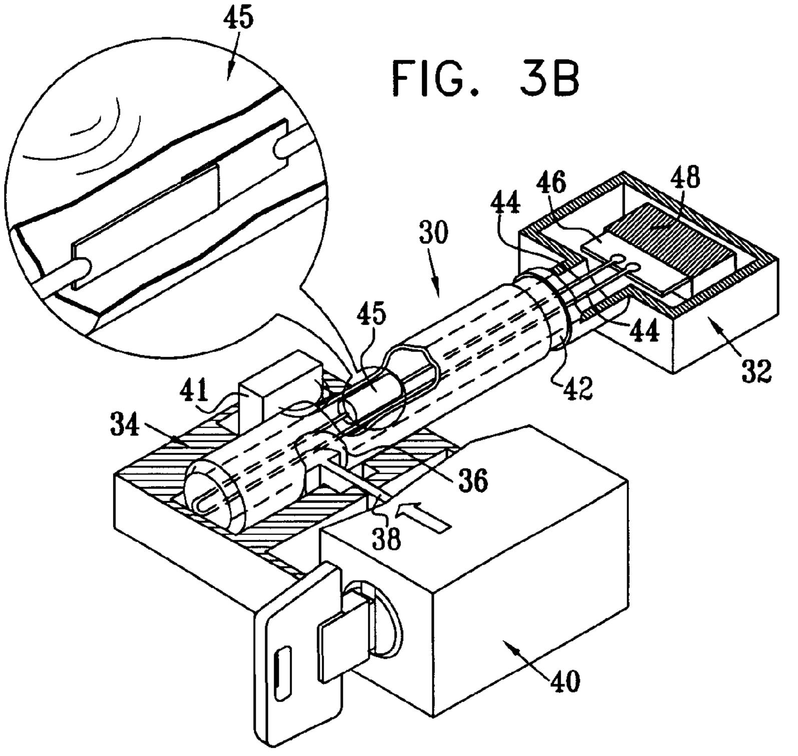

Reference is now made to FIGS. 3A and 3B, which are simplified pictorial illustrations of two stages in the assembly of a lockable electronic seal constructed and operative in accordance with a preferred embodiment of the present invention.

As seen in FIGS. 3A and 3B, there is provided a tamper-resistant reusable lockable electronic seal which preferably comprises a shaft portion 30, which is integrally formed with or fixed to a sensing circuitry and transceiver portion 32 Shaft portion 30 preferably has a generally cylindrical configuration and terminates in a lockable tip 34, preferably formed with an undercut groove 36 which is adapted for lockable engagement with a corresponding locking element 38 forming part of a lock 40, defining a socket, which includes a magnet 41. Lock 40 is here shown to be a key-operated lock, it being appreciated that any other suitable type of lock may be employed. The locking engagement between tip 34 of shaft portion 30 and locking element 38 Is preferably such that without first unlocking the lock, it is impossible to remove the tip 34 from engagement with the locking element 38 without breaking the shaft portion 30.

Shaft portion 30 preferably includes a weakened frangible portion 42, located intermediate the sensing circuitry and transceiver portion 32 and the tip 34. Frangible portion 42 is preferably located closer to sensing circuitry and transceiver portion 32 than to tip 34 and typically has a lesser thickness than the remainder of the shaft portion 30.

A conductive loop 44, including a series connected reed switch 45 which is closed by magnet 41 when shaft portion 30 is in lockable engagement with lock 40, preferably extends through shaft portion 30 through to the tip 34 thereof and is configured and mounted in shaft portion 30, such that breakage of the shaft portion 30 produces a disconnection or significant change in the electrical properties of the conductive loop 44.

In accordance with a preferred embodiment of the present invention, sensing circuitry 46 and an RF transceiver 48 are housed within sensing circuitry and transceiver portion 32. Sensing circuitry 46 is electrically coupled to conductive loop 44 and senses the integrity thereof. Receiving an output from sensing circuitry 46 is transceiver 48, which is operative to provide transmitted information indicating whether the conductive loop 44 is intact. Conventional wireless monitoring circuitry (not shown) may be employed to receive information which is transmitted by RF transceiver 48 and indicates when the shaft portion 30 is located in lockable engagement with lock 40 and when the shaft portion 30 is separated from lock 40 due to either tampering with the seal, which results in breakage of the shaft portion 30, or disengagement of shaft portion 30 and lock 40 by using a key to unlock lock 40 It is appreciated that the provision of reed switch 45 and magnet 41 enables sensing circuitry 46 to sense when the shaft portion 30 is located in lockable engagement with lock 40 and when the shaft portion 30 is separated from lock 40 for any reason, and allows for recording of engagements and disengagements of shaft portion 30 and lock 40.

Figure 4A:
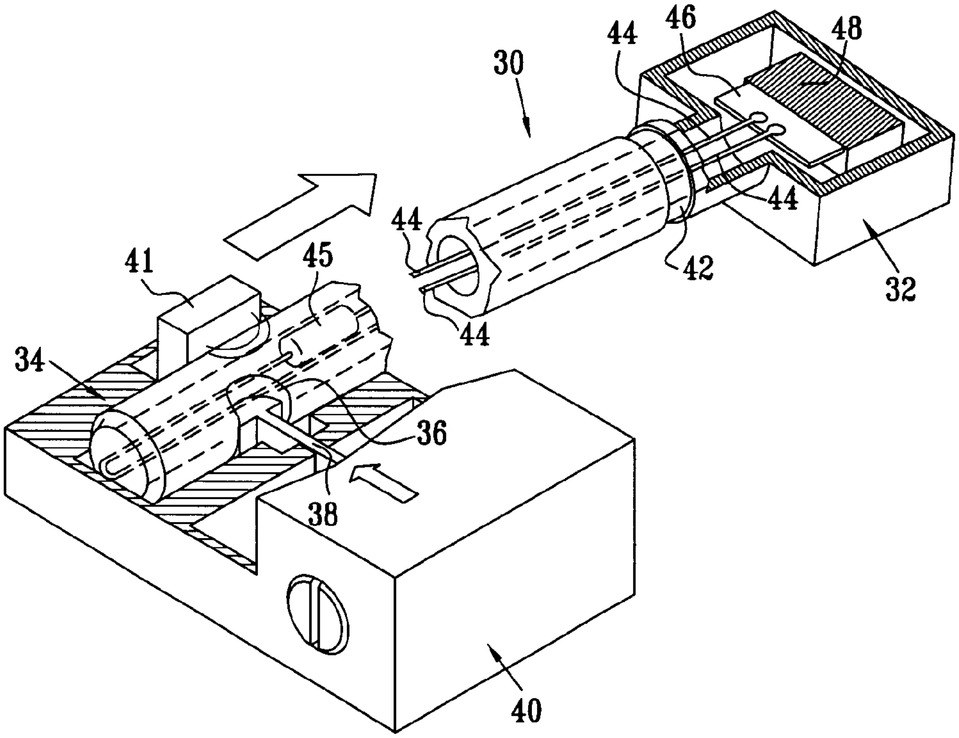
FIGS. 4A and 4B are simplified pictorial illustrations of two different types of breaks produced in the lockable electronic seal of FIGS. 3A and 3B.

Reference is now made to FIGS. 4A and 4B, which are simplified pictorial illustrations of two different types of breaks produced in the lockable electronic seal of FIGS. 3A and 3B As noted above, application of force to the seal of FIGS. 4A and 4B in an attempt to separate shaft portion 30 from locking element 38 will not cause tip 34 to be disengaged from locking element 38, without first breaking the shaft portion 30 FIG. 4A shows such a break at a location along the shaft portion 30 which lies just above the tip 34. It is seen that this break produces a disconnection or significant change in the electrical properties of the conductive loop 44.

Figure 4B:
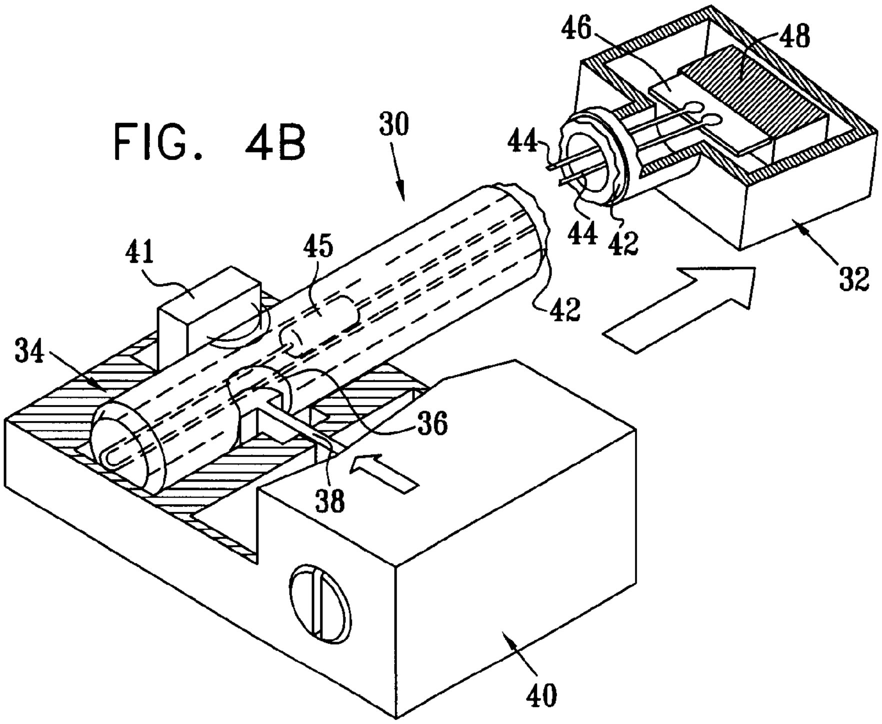

FIG. 4B shows such a break at the frangible portion 42 along the shaft portion 30. It is seen that this break also produces a disconnection or significant change in the electrical properties of the conductive loop 44.

It is appreciated that the reed switch and magnet shown in the illustrated embodiments of FIGS. 3A–4B can also be used in the embodiments of FIGS. 1A–2B.

Figure 5A:
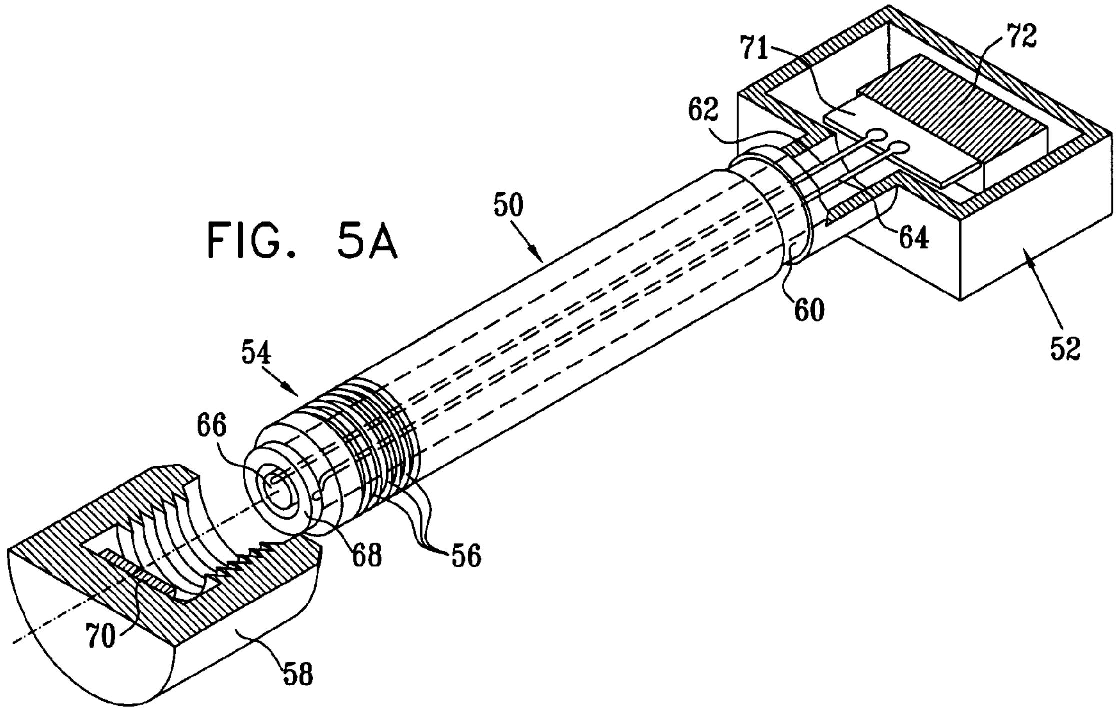
FIGS. 5A and 5B are simplified pictorial illustrations of two stages in the assembly of a press-fit electronic seal constructed and operative in accordance with another preferred embodiment of the present invention.
Figure 5B:
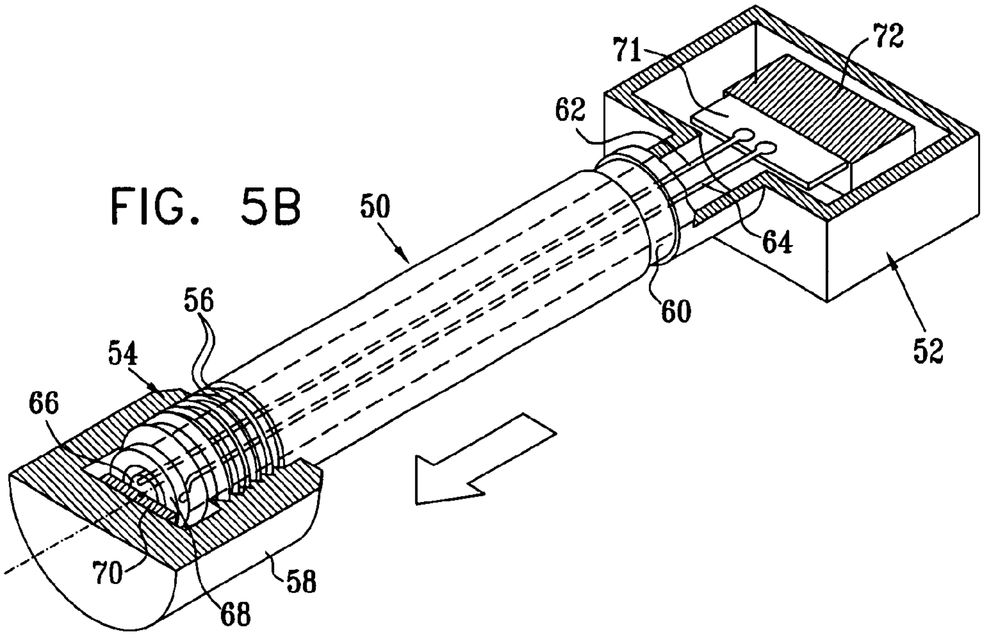

Reference is now made to FIGS. 5A and 5B, which are simplified pictorial illustrations of two stages in the assembly of a press-fit electronic seal constructed and operative in accordance with another preferred embodiment of the present invention.

As seen in FIGS. 5A and 5B, there is provided a tamper-resistant electronic seal which preferably comprises a shaft portion 50, which is integrally formed with or fixed to a sensing circuitry and transceiver portion 52 Shaft portion 50 preferably has a generally cylindrical configuration and terminates in a press-fit tip 54, preferably formed with a series of circumferential teeth 56 which are adapted for press-fit engagement with corresponding tooth-like recesses formed in a socket 58. The press-fit engagement between tip 54 of shaft portion 50 and socket 58 is preferably such that it is impossible to remove the tip 54 from the socket without breaking the shaft portion 50.

Shaft portion 50 preferably includes a weakened frangible portion 60, located intermediate the sensing circuitry and transceiver portion 52 and the tip 54. Frangible portion 60 is preferably located closer to sensing circuitry and transceiver portion 52 than to tip 54 and typically has a lesser thickness than the remainder of the shaft portion 50.

A pair of elongate conductors 62 and 64 preferably extends through shaft portion 50 through to the tip 54 thereof and is configured and mounted in shaft portion 50, such that breakage of the shaft portion 50 produces a disconnection or significant change in the electrical properties of at least one and preferably both of conductors 62 and 64. Preferably, conductors 62 and 64 communicate with respective contacts 66 and 68 which are exposed at the end of tip 54 and are arranged to electrically engage an electrical shorting contact 70 at the corresponding interior surface of socket 58 when shaft portion 50 is fully press-fit mounted into socket 58, thereby defining a conductive loop.

In accordance with a preferred embodiment of the present invention, sensing circuitry 71 and an RF transceiver 72 are housed within sensing circuitry and transceiver portion 52. Sensing circuitry 71 is electrically coupled to conductors 62 and 64 and senses the integrity of a conductive loop which is defined by conductors 62 and 64 when the shaft portion 50 is fully seated in socket 58. Receiving an output from sensing circuitry 71 is transceiver 72, which is operative to provide transmitted information indicating whether the conductive loop is intact. Conventional wireless monitoring circuitry (not shown) may be employed to receive information which is transmitted by RF transceiver 72 and indicates tampering with the seal which results in breakage of the shaft portion 50.

Figure 6A:
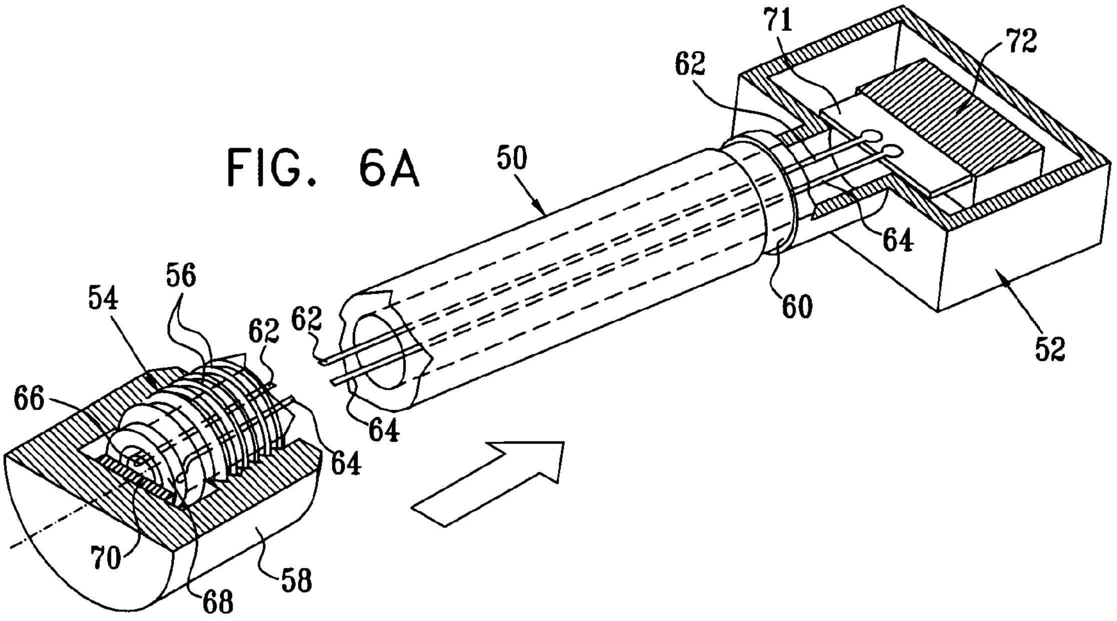
FIGS. 6A and 6B are simplified pictorial illustrations of two different types of breaks produced in the press-fit electronic seal of FIGS. 5A and 5B.

Reference is now made to FIGS. 6A and 6B, which are simplified pictorial illustrations of two different types of breaks produced in the press-fit electronic seal of FIGS. 5A and 5B As noted above, application of force to the seal of FIGS. 6A and 6B in an attempt to separate shaft portion 50 from socket 58 will not cause tip 54 to be disengaged from socket 58, without first breaking the shaft portion 50 FIG. 6A shows such a break at a location along the shaft portion 50 which lies just above the tip 54. It is seen that this break produces a disconnection or significant change in the electrical properties of the conductive loop defined by conductors 62 and 64.

Figure 6B:
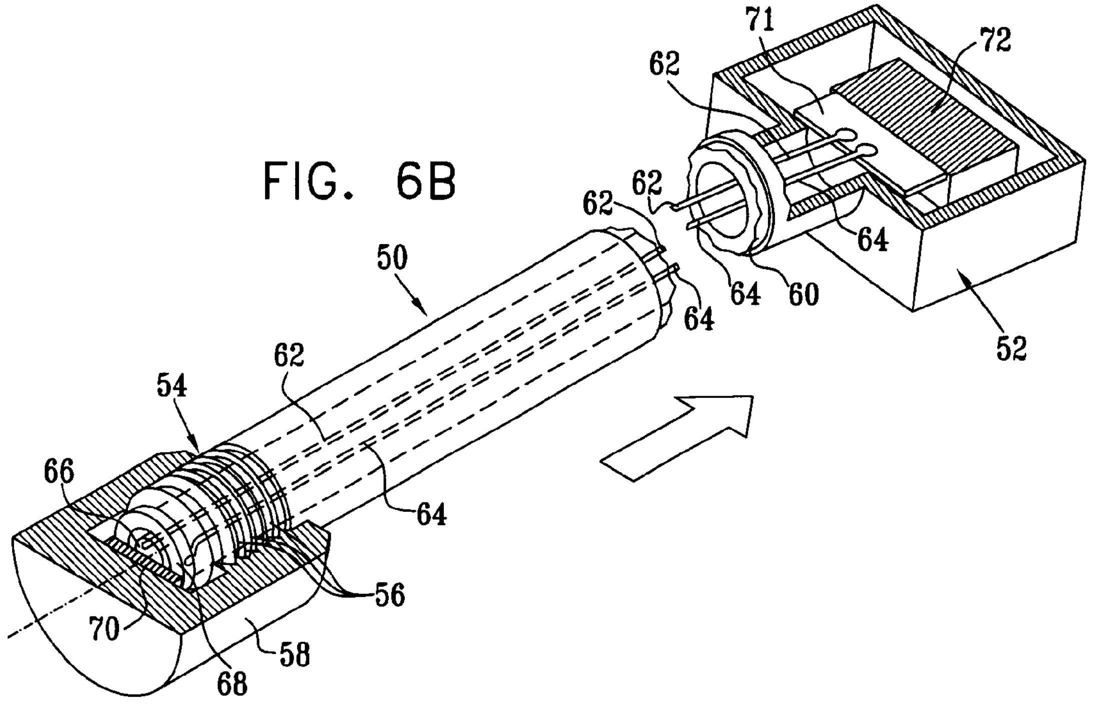

FIG. 6B shows such a break at the frangible portion 60 along the shaft portion 50. It is seen that this break also produces a disconnection or significant change in the electrical properties of the conductive loop.

Figure 7A:
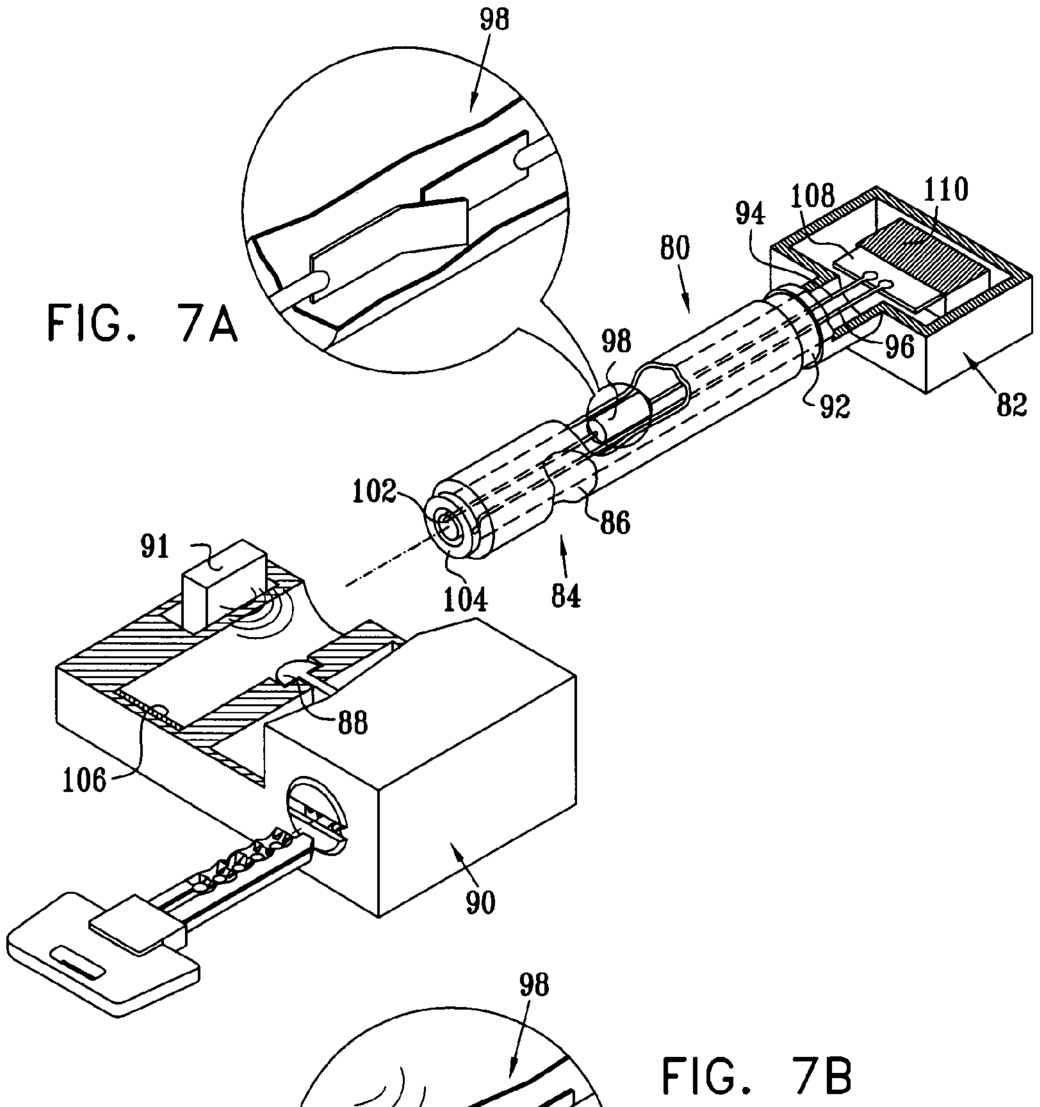
FIGS. 7A and 7B are simplified pictorial illustrations of two stages in the assembly of a lockable electronic seal constructed and operative in accordance with another preferred embodiment of the present invention.
Figure 7B:
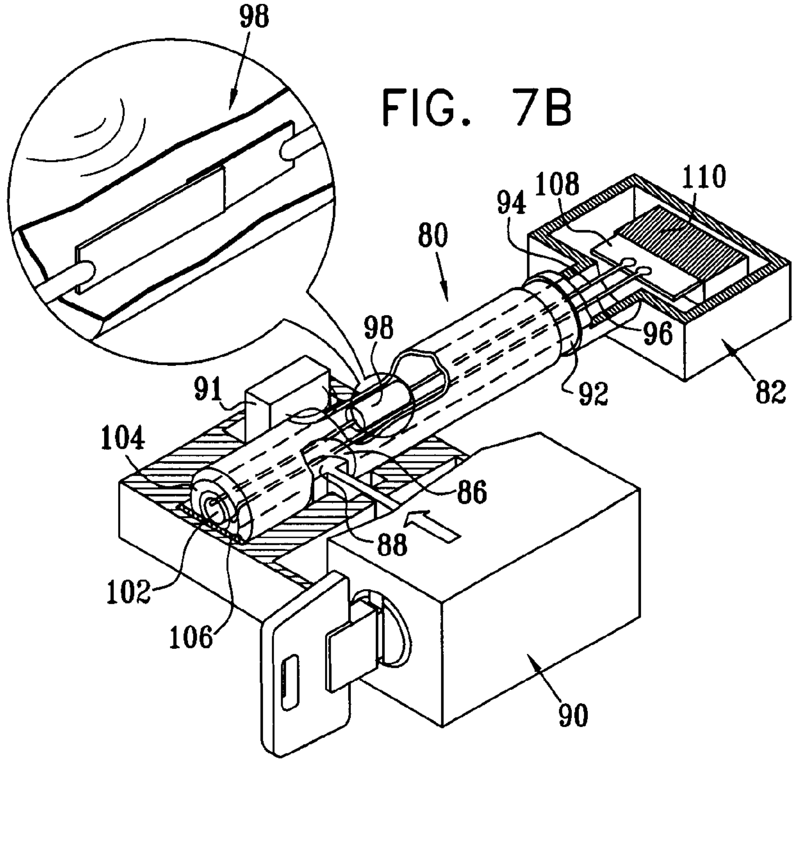

Reference is now made to FIGS. 7A and 7B, which are simplified pictorial illustrations of two stages in the assembly of a lockable electronic seal constructed and operative in accordance with another preferred embodiment of the present invention.

As seen in FIGS. 7A and 7B, there is provided a tamper-resistant lockable electronic seal which preferably comprises a shaft portion 80, which is integrally formed with or fixed to a sensing circuitry and transceiver portion 82. Shaft portion 80 preferably has a generally cylindrical configuration and terminates in a lockable tip 84, preferably formed with an undercut groove 86 which is adapted for lockable engagement with a corresponding locking element 88 forming part of a lock 90, defining a socket, which includes a magnet 91. Lock 90 is here shown to be a key-operated lock, it being appreciated that any other suitable type of lock may be employed. The locking engagement between tip 84 of shaft portion 80 and locking element 88 is preferably such that without first unlocking the lock, it is impossible to remove the tip 84 from engagement with the locking element 88 without breaking the shaft portion 80.

Shaft portion 80 preferably includes a weakened frangible portion 92, located intermediate the sensing circuitry and transceiver portion 82 and the tip 84. Frangible portion 92 is preferably located closer to sensing circuitry and transceiver portion 82 than to tip 84 and typically has a lesser thickness than the remainder of the shaft portion 80.

A pair of elongate conductors 94 and 96, at least one of which includes a series connected reed switch 98 which is closed by magnet 91 when shaft portion 80 is in lockable engagement with lock 90, extends through shaft portion 80 through to the tip 84 thereof and is configured and mounted in shaft portion 80, such that breakage of the shaft portion 80 produces a disconnection or significant change in the electrical properties of at least one and preferably both of conductors 94 and 96. Preferably, conductors 94 and 96 communicate with respective contacts 102 and 104 which are exposed at the end of tip 84. Contacts 102 and 104 are arranged to electrically engage an electrical shorting contact 106 at the corresponding interior surface of lock 90 when shaft portion 80 is in lockable engagement with lock 90. This electrical engagement, together with the closing of series connected reed switch 98 by magnet 91, thereby defines a conductive loop.

In accordance with a preferred embodiment of the present invention, sensing circuitry 108 and an RF transceiver 110 are housed within sensing circuitry and transceiver portion 82. Sensing circuitry 108 is electrically coupled to conductors 94 and 96 and senses the integrity of a conductive loop which is defined by conductors 94 and 96 when the shaft portion 80 is in lockable engagement with lock 90. Receiving an output from sensing circuitry 108 is transceiver 110, which is operative to provide transmitted information indicating whether the conductive loop is intact. Conventional wireless monitoring circuitry (not shown) may be employed to receive information which is transmitted by RF transceiver 110 and indicates when the shaft portion 80 is located in lockable engagement with lock 90 and when the shaft portion 80 is separated from lock 90 due to either tampering with the seal, which results in breakage of the shaft portion 80, or disengagement of shaft portion 80 and lock 90 by using a key to unlock lock 90 It is appreciated that the provision of reed switch 98 and magnet 91 enables sensing circuitry 108 to sense when the shaft portion 80 is located in lockable engagement with lock 90 and also enables sensing circuitry 108 to sense when the shaft portion 80 is separated from lock 90 for any reason, and allows for recording of engagements and disengagements of shaft portion 80 and lock 90

Figure 8A:
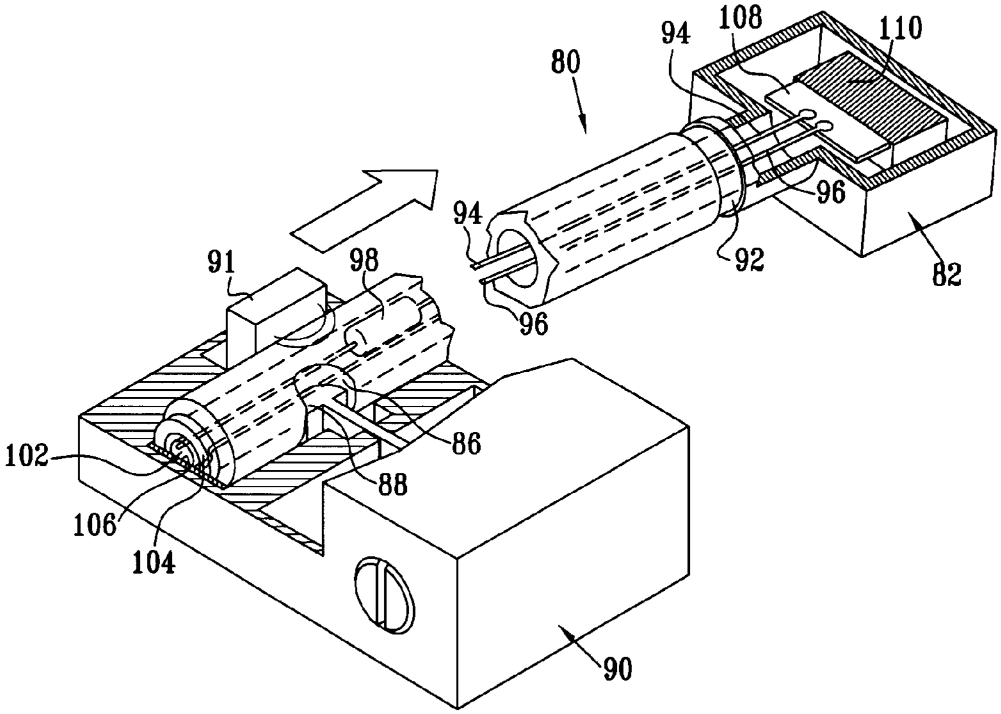
FIGS. 8A and 8B are simplified pictorial illustrations of two different types of breaks produced in the lockable electronic seal of FIGS. 7A and 7B.

Reference is now made to FIGS. 8A and 8B, which are simplified pictorial illustrations of two different types of breaks produced in the lockable electronic seal of FIGS. 7A and 7B As noted above, application of force to the seal of FIGS. 8A and 8B in an attempt to separate shaft portion 80 from locking element 88 will not cause tip 84 to be disengaged from locking element 88, without first breaking the shaft portion 80 FIG. 8A shows such a break at a location along the shaft portion 80 which lies just above the tip 84 It is seen that this break produces a disconnection or significant change in the electrical properties of the conductive loop defined by conductors 94 and 96.

Figure 8B:
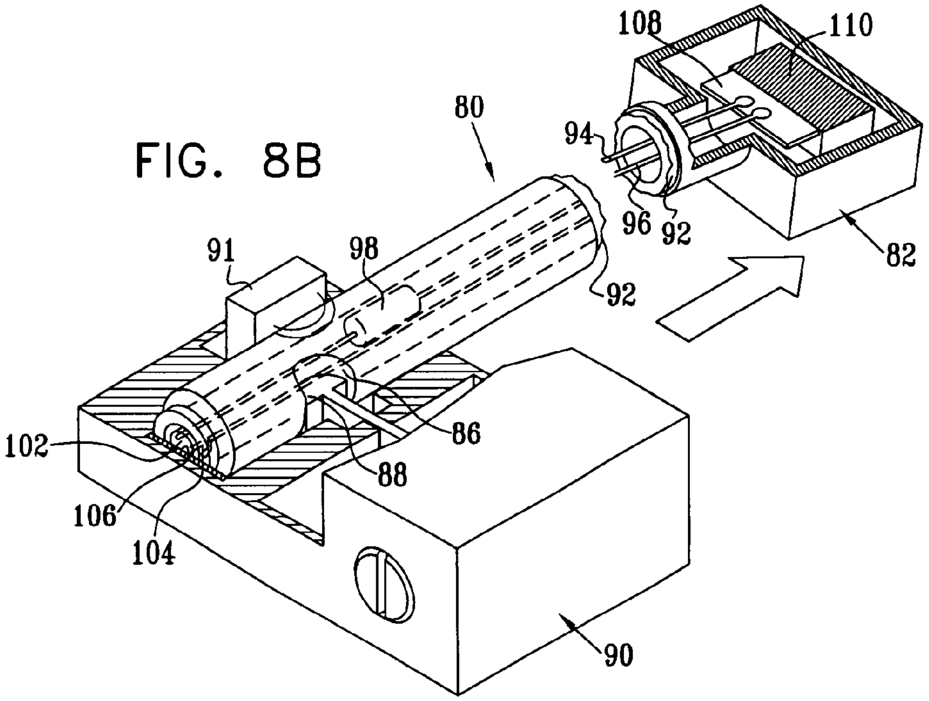

FIG. 8B shows such a break at the frangible portion 92 along the shaft portion 80 It is seen that this break also produces a disconnection or significant change in the electrical properties of the conductive loop defined by conductors 94 and 96.

It is appreciated that the reed switch and magnet shown in the illustrated embodiments of FIGS. 7A–8B can also be used in the embodiments of FIGS. 5A–6B.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A tamper-resistant remotely monitorable electronic seal comprising;

a shaft portion including at least one conductive path;

a socket arranged to engage said shaft portion in a monitorable manner, whereby disengagement of said socket and said shaft portion results in a monitorable event; and a wireless communicator associated with at least one of said shaft portion and said socket and being operative to provide a remotely monitorable indication of said monitorable events, said at least one conductive path being interrupted in response to disengagement of said socket and said shaft portion, and said shaft portion and said at least one conductive path being breakable in response to disengagement of said socket and said shaft portion.

2. A tamper-resistant remotely monitorable electronic seal according to claim 1 and wherein:

said shaft portion comprises a frangible shaft portion having a press-fit tip;

said socket comprises a press-fit socket arranged to engage said press-fit tip in a destructably removable manner, whereby disengagement of said socket and said shaft portion results in breakage of said shaft portion;

said at least one conductive path extends at least through said shaft portion and is breakable in response to breakage of said shaft portion; and said wireless communicator is associated with at least one of said shaft portion and said press-fit socket and is operative to provide a remotely monitorable indication of the integrity or lack of integrity of said at least one conductive path.

3. A tamper-resistant remotely monitorable electronic seal according to claim 2 and wherein said at least one conductive path is defined by conductors extending through said shaft portion which are in electrical contact with a conductor formed in said press-fit socket when said shaft portion and said socket are in press-fit engagement.

4. A tamper-resistant remotely monitorable electronic seal according to claim 2 and wherein said communicator is located in a sensing circuitry and communicator housing integrally formed with said shaft portion.

5. A tamper-resistant remotely monitorable electronic seal according to claim 2 and wherein said frangible shaft portion comprises at least one frangible location having relatively weak mechanical strength as compared with other portions of the shaft portion.

6. A tamper-resistant remotely monitorable electronic seal according to claim 2 and wherein said press-fit tip comprises a toothed tip.

7. A tamper-resistant remotely monitorable electronic seal according to claim 2 and wherein said at least one conductive path comprises at least one reed switch which is operated by a magnet associated with said socket whereby when said shaft portion is separated from said socket for any reason, said at least one conductive path is broken.

8. A tamper-resistant remotely monitorable electronic seal according to claim 1 and wherein:

said shaft portion comprises a frangible shaft portion having a lockable portion;

said socket comprises a locking element arranged to engage said lockable portion in a destructably removable manner, whereby disengagement of said locking element and said shaft portion results in breakage of said shaft portion;

said at least one conductive path extends at least through said shaft portion and is breakable in response to breakage of said shaft portion; and said wireless communicator is associated with at least one of said shaft portion and said socket and is operative to provide a remotely monitorable indication of the integrity or lack of integrity of said at least one conductive path.

9. A tamper-resistant remotely monitorable electronic seal according to claim 8 and wherein said at least one conductive path comprises at least one reed switch which is operated by a magnet associated with said socket whereby when said shaft portion is separated from said socket for any reason, said at least one conductive path is broken.

10. A tamper-resistant remotely monitorable electronic seal according to claim 8 and wherein said at least one conductive path comprises at least one reed switch which is operated by a magnet associated with said socket whereby when said shaft portion is separated from said socket for any reason, said at least one conductive path is broken,and is defined by conductors extending through said shaft portion and which are in electrical contact with a conductor formed in said socket when said shaft portion and said socket are in lockable engagement.

11. A tamper-resistant remotely monitorable electronic seal according to claim 8 and wherein said communicator is located in a sensing circuitry and communicator housing integrally formed with said shaft portion.

12. A tamper-resistant remotely monitorable electronic seal according to claim 8 and wherein said frangible shaft portion comprises at least one frangible location having relatively weak mechanical strength as compared with other portions of said shaft portion.

13. A tamper-resistant remotely monitorable electronic seal according to claim 8 and wherein said shaft portion comprises a groove adaptable for lockable engagement with said locking element.

14. A tamper-resistant remotely monitorable electronic seal according to claim 1 and wherein said wireless communicator is a transceiver.

* * * * *